US009427004B2

(12) United States Patent
Schlosser et al.

(10) Patent No.: US 9,427,004 B2
(45) Date of Patent: Aug. 30, 2016

(54) CAFFEINATED COFFEE-FLAVORED CEREAL

(75) Inventors: David Schlosser, Hollywood, CA (US); Bradley Strahm, Sabetha, KS (US)

(73) Assignee: David Schlosser, Hollywood, CA (US)

( * ) Notice: Subject to any disclaimer, the term of this patent is extended or adjusted under 35 U.S.C. 154(b) by 1018 days.

(21) Appl. No.: 11/306,187

(22) Filed: Dec. 19, 2005

(65) Prior Publication Data

US 2007/0098874 A1    May 3, 2007

Related U.S. Application Data

(60) Provisional application No. 60/596,976, filed on Nov. 2, 2005.

(51) Int. Cl.
*A23L 1/164* (2006.01)
*A23L 1/18* (2006.01)

(52) U.S. Cl.
CPC ............ *A23L 1/1641* (2013.01); *A23L 1/164* (2013.01); *A23L 1/18* (2013.01)

(58) Field of Classification Search
USPC ............. 426/89, 94, 96, 103, 549, 560, 620
See application file for complete search history.

(56) References Cited

U.S. PATENT DOCUMENTS

| | | | |
|---|---|---|---|
| 976,332 A * | 11/1910 | Anhaltzer | 426/18 |
| 2,954,296 A * | 9/1960 | Clausi et al. | 426/559 |
| 3,366,485 A * | 1/1968 | Moen et al. | 426/275 |
| 3,494,769 A | 2/1970 | Tressler | |
| 3,578,459 A | 5/1971 | Corbin | |
| 3,992,556 A | 11/1976 | Kovacs et al. | |
| 4,089,984 A | 5/1978 | Gilbertson | |
| 4,485,120 A | 11/1984 | Gantwerker et al. | |
| 4,585,664 A | 4/1986 | Kohlwey | |
| 4,755,390 A | 7/1988 | Calandro et al. | |
| 5,035,914 A | 7/1991 | Doerr | |
| 5,176,936 A * | 1/1993 | Creighton et al. | 426/618 |
| 5,342,188 A | 8/1994 | Zimmermann | |
| 5,709,902 A * | 1/1998 | Bartolomei et al. | 426/620 |
| 5,894,027 A | 4/1999 | Kazemzadeh | 426/94 |
| 6,048,561 A * | 4/2000 | Ohtake et al. | 426/559 |
| 6,103,283 A * | 8/2000 | Zukerman et al. | 426/285 |
| 6,413,558 B1 * | 7/2002 | Weber et al. | 426/2 |
| 2004/0013771 A1* | 1/2004 | Funk et al. | 426/93 |
| 2005/0266142 A1* | 12/2005 | Green et al. | 426/618 |

OTHER PUBLICATIONS

Joe, Coffe-flavored breakfast cereal, Daily Jive, Dec. 18, 2003, http://www.joemurray.com/2003/12/coffee-flavored-breakfast-cereal-from.thml pp. 1-3.*
Igoe (ed.) Dictionary of Food Ingredients 3rd Edition, Chapman and Hall 1996. p. 23.*
Fast et al. Editors, Breakfast Cereals and How They Are Made, American Association of Cereal Chemists, 1990. pp. 1, 6, 7, 15, 29, 34, and 35.*
Wilstar, Caffeine Content of Popular Drinks, pp. 1-3, http://wilstar.com/caffeine.htm.*
Fast et al ed. Breakfast Cereals and How They Are Made, p. 306, American Association of Cereal Chemists 1990.*
Lempert, Phil. The Scoop on Cereals Mar. 2001, pp. 1-5, http://archive.supermarketguru.com/page.cfm/286.*
Igoe et al Dictionary of Food Ingredients 3rd Edition, Chapman and Hall 1996, pp. 87 and 133.*
Japanese coffee flavored puffed wheat cereal purchased in Japan in 2013, [photos of front, side panels, and back with nutrition label], 4 pages.
Palermo, "Cereal Eats: Japanese Coffee Milk Cereal," Serious Eats [online] Nov. 7, 2011 [retrieved on Mar. 24, 2014]. Retrieved from the Internet: URL: <http://www.seriouseats.com/2011/11/print/cereal-eats-japanese-coffee-milk-cereal.html>, 3 pages.

* cited by examiner

*Primary Examiner* — Kelly Bekker
(74) *Attorney, Agent, or Firm* — KPPB LLP

(57) ABSTRACT

The present application describes coffee-flavored ready to eat cereal.

28 Claims, No Drawings

CAFFEINATED COFFEE-FLAVORED CEREAL

BACKGROUND OF THE INVENTION

1. Field of the Invention

This invention relates to ready-to-eat (R-T-E) food products. More particularly, the invention relates to a cereal product coated with dry powdered coffee or coffee substitute.

2. General Background and State of the Art

Food products that require little or no preparation have been available to the consumer for many years. These food products include breakfast cereals that are pre-sweetened and/or pre-flavored, whereby it is necessary only to add milk or hot water, depending upon the type of cereal and the desired flavor to prepare the cereal for normal consumption. Improvements to breakfast cereal are constantly being developed in terms of flavor and texture. Coffee has one of the most recognized and desirable flavor.

Coffee flavor can be added in limited amounts to R-T-E cereal products. However, at higher levels of coffee flavor, the presence of such high amounts of coffee ingredients can adversely interfere with other desired characteristics. For example, high levels of added coffee ingredients can negatively affect the taste, texture, color or density of the R-T-E cereal products.

Among the various types of R-T-E cereal products, puffed R-T-E cereals are especially desired. Thus, it would be desirable to provide puffed R-T-E cereal with coffee flavoring. One technique involves applying a topical coating especially a sugar coating to provide the desired level of coffee flavor fortification. While useful to provide coffee flavor for those puffed R-T-E cereals intended to be pre-sweetened, not all puffed R-T-E cereals are presweetened.

Extruders are often used in the preparation of various food products and especially in the preparation of ready-to-eat ("R-T-E") cereals such as puffed products. Extruders, especially cooker extruders, are desirable because a single machine can produce large quantities of a cooked cereal dough in a short period of time. Such cooker extruders can be used to prepare cooked dough extrudates which can thereafter be formed into individual cereal or snack pieces, with the formation of such pieces possibly involving puffing the pieces to form finished puffed R-T-E cereals. In another variation that is increasingly popular, the conditions of the extruder and the cooked cereal dough are such that the dough puffs immediately upon being extruded and is cut into individual puffed pieces at the die head. Such a process is referred to generally as "direct expansion".

U.S. Pat. No. 3,494,769 describes a breakfast cereal suitable for use as cold cereal by the addition of milk, or as a hot cereal by the addition of hot water. The cereal is prepared by heating rolled oats to cook the starch and protein contained therein, applying liquid milk in sufficient quantity only to wet the oats and to distribute it evenly throughout the oat product, and then drying the wet product to crispness, producing a crunchy product. During the manufacturing process, the flaky or granular cereal is either sprayed or sprinkled with liquid milk in which sugar, salt, fruit juice puree, and/or flavoring materials are dissolved, whereby the mixture is absorbed by the oat flakes and evenly distributed throughout the body of the flakes.

An example of a pre-sweetened breakfast cereal is described in U.S. Pat. No. 4,089,984. This patent purports to overcome the difficulty in the prior art of sweetening cereals with fructose sweeteners. The use of fructose sweeteners, which are normally in a liquid state, was not practical before the invention described in this patent, since such coating resulted in a sticky, messy product. The teaching in this patent overcomes this difficulty and enables liquid fructose sweeteners to be used on cereal products, by covering or coating the sticky fructose coating with an edible powdered material to eliminate the stickiness. Examples of the powdered material are given as sucrose, lactose, dried corn syrup solids, corn starch, wheat starch, dried milk solids and/or dextrose. In the process described in this patent, the liquid sweetener is treated to evaporate a majority of the moisture from the liquid sweetener and then it is applied to the cereal pieces by using an enrober drum while the liquid sweetener is still at an elevated temperature and thus fluid. A limited amount of the powdered material is dusted onto the coated cereal pieces as cooling takes place. The liquid sweetener captures the powdered material, and the powdered material substantially eliminates the cohesiveness and stickiness of the coated pieces. There is no suggestion in this patent of adding coffee flavoring or coffee extract to the cereal so that addition of milk or other liquid results in a coffee flavored liquid.

A creamy orange flavored snack cereal is described in U.S. Pat. No. 5,035,914. The food product described in this patent includes a popped cereal that includes a powdered dairy or dairy substitute product which simulates cream flavor, in combination with powdered orange or artificial orange flavor. The purpose of this patent is to provide a product which may be eaten as a snack without milk or liquid and yet has a "creamy" flavor. The patent describes two essential ingredients as being required in order to produce the invention. These are the constituent which creates the simulated cream flavor, and the constituent which creates the orange flavor. The cream flavor or creamy ice cream flavor is obtained by using powdered non-dairy cream substitutes such as, for example, coffee creamer or cream flavoring. The patent states that the food product may be eaten with milk, or used as a dry snack eaten like potato chips or other dry snacks. There is no suggestion in this patent of adding coffee flavoring or coffee extract coating onto prepared cereal pieces.

Other ready-to-eat or easily prepared food products are disclosed in U.S. Pat. Nos. 3,578,459, 3,992,556, 4,485,120, 4,585,664 and 4,755,390. These patents all relate to the use of various additives and/or manufacturing processes which enhance the nutritional value and/or quality, e.g., texture, flavor, etc., of the resultant product.

Applicant is not aware of any prior art teaching of a dry, ready-to-eat cereal product coated with a coffee product, such as espresso, cappuccino flavor, caffeinated coffee or decaffeinated coffee, or any combination thereof, so that it is necessary only to add milk to produce a ready-to-eat cereal and milk combination. Alternatively, the coffee-coated dry cereal product of the invention may be eaten straight from the box, without the addition of milk or water or other beverage. The prior art does not disclose anything comparable.

SUMMARY OF THE INVENTION

In one aspect, the present invention is directed to a ready-to-eat cereal product having a coffee flavor. The cereal may be coated with a composition comprising a coffee extract or coffee powder. The coffee extract or coffee powder may be obtained from regular bean, espresso bean or cappuccino bean. The coffee extract or coffee powder also may be caffeinated or decaffeinated. The caffeine may be present from about 50 mg to about 500 mg per 100 g of the cereal, or about 100 mg to about 450 mg per 100 g of the cereal, or about 150 mg to about 400 mg per 100 g of the cereal, or about 250 mg to about 400 mg per 100 g of the cereal, or about 300 mg to about 375 mg per 100 g of the cereal, or about 315 mg to about 350 mg per 100 g of the cereal.

In another aspect of the invention, the cereal product may contain sugar. The sugar may be present from about 5 to 50 grams per 100 g of the cereal, or about 10 to about 45 grams per 100 g of the cereal, or 15 to 40 grams per 100 g of the cereal, or about 20 to about 38 grams per 100 g of the cereal, or about 30 to about 38 grams per 100 g of the cereal.

In another aspect of the invention, the coffee flavor may be attained by artificial coffee flavoring. Regarding the cereal, the base product may be made from rice. The cereal may have substantially same shape, structure and texture as crisped rice. Further, the cereal product may be shaped substantially in the form of a coffee bean. The cereal may have a shiny surface, or a floury surface.

In another aspect, the invention is directed to a process for preparing a ready-to-eat cereal product comprising:

(i) preparing a base cereal product by extruding a mixture of flour and slurry which comprises coffee extract or coffee powder, and (ii) applying a coating of the slurry onto the surface of the base cereal product to yield a coated cereal product.

In the process, the amount of slurry as a percent of coating slurry plus base product may be about 35% to about 60%, or 40% to about 55%, or about 45% to about 52%.

In the process, the slurry may comprise about 15% to about 60% by weight coffee extract, or about 20% to about 50% by weight coffee extract, or about 25% to about 45% by weight coffee extract, or about 30% to about 40% by weight coffee extract, or about 35% to about 38% by weight coffee extract.

In yet another aspect, the invention is directed to a process for preparing a ready-to-eat cereal product comprising: preparing a powdery composition comprising coffee extract, and applying a coating of the powdery composition onto the surface of the cereal to yield the coated cereal product.

These and other objects of the invention will be more fully understood from the following description of the invention.

DETAILED DESCRIPTION OF THE PREFERRED EMBODIMENTS

In the present application, "a" and "an" are used to refer to both single and a plurality of objects.

As used herein, "coffee flavoring" refers to any product that confers coffee taste or aroma to the cereal. The product may encompass ground coffee or artificial flavoring. Such coffee flavoring may include without limitation, latte, cappuccino, espresso, hazelnut, mocha, amaretto, chocolate, chocolate raspberry, irish cream, vanilla, almond, butterscotch, caramel, cinnamon, créme de menthe, and kahlua.

Throughout the specification and claims, percentages are by weight and temperatures in degrees Fahrenheit unless otherwise indicated.

The present products include cooked cereal doughs, intermediate dough products such as cereal pellets or snack food half products and finished dried food products prepared therefrom. While in the current description particular attention is paid to the provision of such finished cooked cereal dough products such as Ready-To-Eat or breakfast cereals and optimally to fried or baked snacks, the skilled artisan will appreciate that the present invention finds suitability for use in connection with the provision of a variety of other food products from cooked cereal doughs. For example, baked or expanded products in the form of breakfast or quick bread bars or cylinders. Also, while the present invention is particularly directed towards the provision of food products intended for human consumption having the particular higher organoleptic qualities such human food products require, the present invention can also find suitability for use in the provision of food products intended for animal consumption such as pet foods.

The cereal and snack food art is replete with teachings on cooked cereal doughs and the skilled artisan will have no trouble formulating and preparing a cooked cereal dough. Generally, a cooked cereal dough can be prepared by blending various dry cereal ingredients together with water and cooking to gelatinize the starchy components and to develop a cooked flavor. The cooked material can also be mechanically worked to form a cooked cereal dough. The cooking and mechanical work can occur simultaneously or sequentially. The dry ingredients can also include various additives such as sugar(s), salt and mineral salts, e.g., trisodium phosphate, and starches. In addition to water, various liquid ingredients such as corn (maize) or malt syrups can be added.

An essential component of the present cooked cereal doughs is a starchy cereal ingredient. The starchy cereal ingredient can comprise any conventionally employed starchy cereal or, synonymously, farinaceous material, for use in a ready-to-eat cereal. Exemplary suitable starchy cereals include cereal grains, cut grains, grits or flours from wheat, rice, corn (maize), oats, barley, rye, triticale or other cereal grains and mixtures thereof. The flours can be whole flours or flour fractions such as with the germ fraction or husk fraction removed or, alternatively, brans. Of course, the R-T-E cereal art is well developed and the skilled artisan will have no difficulty selecting suitable farinaceous materials for use herein.

The starchy cereal component(s) can comprise from about 40 to about 99% (dry basis) of the cooked cereal dough composition. Better results in terms of organoleptic attributes and reductions in R-T-E cereal piece frangibility are obtained when the cereal ingredients comprise about 75 to 95% of the cooked cereal dough composition. For best results the cereal ingredients comprise about 80 to 95% of the present cereal products.

The present cooked cereal dough products can optionally additionally comprise minor amounts such as 1% to 30%, preferably about 1% to 12%, of one or more supplemental starchy cereal components. The starchy cereal component can comprise any conventionally employed starchy cereal or, synonymously, farinaceous material, for use in a ready-to-eat cereal. Exemplary suitable starchy cereals include cereal grains, cut grains, grits or flours from wheat, rice, corn, oats, barley, rye, triticale or other cereal grains and mixtures thereof. The flours can be whole flours or flour fractions such as with the germ fraction or husk fraction removed or, alternatively, brans.

In certain embodiments, the cooked cereal dough can be formulated to be more readily puffable such as by deep fat frying, microwave heating, gun puffing, jet zone heating, direct expansion, etc. More easily puffed doughs can have high levels of amylopectin-type starch supplied either by selection of high amylopectin containing starchy cereal materials, or by addition of pure amylopectin starches or both. By high amylopectin level herein is meant greater than 20% up to about 80% by weight (dry basis). In still other variations, the puffed cereal pieces can comprise pure starches or pure modified starches to assist in providing desired puff volumes. Of course, the R-T-E cereal art is well developed and the skilled artisan will have no difficulty selecting suitable farinaceous and/or starchy materials (e.g., potato starch) for use herein.

The cooked cereal dough additionally comprises about 3% to 35% moisture. The particular moisture content depends, in part, upon the particular cereal ingredients, desired finished products, cooking equipment and techniques employed. The present invention further comprises cooked cereal dough intermediate products of varying moisture content such as cereal dough pellets and dried cereal pellets.

If desired, the present cereal dough composition can additionally comprise about 0.1 to about 15% (dry weight) by weight sugar(s), preferably about 0.5% to 5%, or, synonymously herein, nutritive carbohydrate sweetening agents. Such materials are also well known in the R-T-E cereal art. Useful herein as the sugar component is sucrose. However, the sugar(s) component can additionally comprise conventional fructose, maltose, dextrose, honey, fruit juice solids, brown sugar, and the like. In addition to providing desirable sweetness, the sugar component additionally beneficially affects the cereal color and texture. Better results are obtained, especially for R-T-E cereal products, when the sugar(s) component comprises from about 1% to about 10% by weight of the composition.

If cooked cereal dough products having high protein levels or high levels of soy isoflavones are desired, then the cooked cereal dough can further comprise about 1% to about 40% of a soy ingredient such as soy flour, soy protein, soy protein isolate and mixtures thereof.

In a preferred embodiment for ready-to-eat cereals, the present cereal compositions are further essentially defined in part by low fat levels, i.e., the present cereals do not comprise added or absorbed fat. Thus, the total fat or lipid component is quite low. The fat content results from the native fat associated with the starchy cereal component(s). Permissible low fat additions can also result from adding emulsifiers and from vitamin or flavor addition. However, the total fat content of the cereal compositions should be less than about 3%, preferably less than about 2%. Preferably, the R-T-E cereal is substantially free of any fat or oil incorporated into the cooked cereal dough. Such "added fat" is to be distinguished from "absorbed fat" that is picked up during deep fat frying used to prepare finished snack products herein. In more preferred embodiments, R-T-E cereals are further characterized as free of any absorbed fat.

If desired, the present cereal dough composition can additionally include a variety of materials designed to improve the aesthetic, organoleptic or nutritional qualities of the cereal. These adjuvant materials can include vitamin especially selected B vitamins, e.g., riboflavin and/or other mineral fortification (e.g., magnesium, iron, selenium, and/or chromium), colors, flavors, high potency sweetener(s), and mixtures thereof. The precise ingredient concentration in the present cereal composition will vary in known manner. Generally, however, such materials can each comprise about 0.01% to about 2% dry weight of the cereal composition. Conventional methods and techniques of vitamin fortification can be used herein. Due in part to their heat sensitivity, vitamin fortification especially of heat sensitive vitamins is typically practiced by topical application to the R-T-E cereal and such a technique is preferred herein.

One especially useful material is common salt. Desirably, the salt comprises about 0.1 to 2%, preferably about 0.5 to 1.0% of the cereal composition.

Still another highly preferred ingredient is a malt syrup flavor ingredient. The malt syrup comprises about 1 to 8% (dry basis), preferably about 2 to 5%.

Fiber, especially insoluble fiber, is believed to adversely affect selected mineral and vitamin absorption. Accordingly, in highly preferred embodiments, the present cooked cereals have a insoluble fiber content of less than 5%. If high fiber products are desired, then the cooked cereal dough can comprise about 0.1% to 5% of insulin.

Especially in the provision of puffed cooked cereal dough pieces prepared by direct expansion from twin screw extruders, still another useful ingredient is a leavening agent such as sodium bicarbonate.

Method of Preparation

In the preferred embodiment, the present methods essentially comprise a first step of providing a cooked cereal composition such as a cereal dough or cereal mass within the herein specified ranges.

The present raw cereal components and other ingredients can be cooked and worked to form the present cooked cereal doughs by conventional cooked cereal dough preparation methods. The total moisture addition is controlled to provide a cooked cereal comprising about 10 to 35% moisture, preferably about 22 to 30% moisture.

The cereal dough cooking step can be practiced using a batch, atmospheric cooker and a low pressure extruder cooker especially those equipped with a conditioner pre-cooker, or a twin screw extruder. The cereal is cooked with steam and sufficient amounts of added water for times and at temperatures sufficient to gelatinize the cereal starch and to develop desired levels of cooked cereal flavor.

In one variation of this embodiment, the cereal ingredients are cooked in a cooker such as a single or, in a preferred embodiment, in a twin screw cooker extruder to form a cooked cereal dough.

A cooked cereal mash is quite similar except that larger sized particles such as whole grains or cut grains are cooked rather than cereal flour ingredients.

The cereal dough cooking step can be practiced using a batch, atmospheric cooker and a low pressure extruder cooker especially those equipped with a conditioner pre-cooker, or a twin screw extruder. The cereal is cooked with steam and sufficient amounts of added water for times and at temperatures sufficient to gelatinize the cereal starch and to develop desired levels of cooked cereal flavor.

Forming into Desirably Shaped and Sized Pieces

The present methods further essentially comprise the step of forming the dough into individual pieces of desirable shape and size. Conventional techniques and equipment can be employed to practice this step and the skilled artisan will have no difficulty in selecting those suitable for use herein.

The present cereal compositions can be fabricated into any of a variety of common R-T-E cereal forms including, shreds, biscuits, mini biscuits, flakes, or any common R-T-E cereal or cereal based snack product form, shape or size. The present cereal compositions can also be formulated and fabricated so as to provide puffed cereals of various shapes and sizes such as "O's" or in the shape of coffee beans. Especially desirable for use herein are puffed pieces, especially puffed oblong or spherical shaped pieces.

For example, a great number of R-T-E cereals and snack products are prepared from cooked cereal doughs that are formed into pellets. The cooked cereal dough can be fed to a pellet former to form pellets. For example, in the preparation of R-T-E cereals in flake form, the pellets are sized to have a pellet count of about 35 to 50 per 10 g and a moisture content of 16 to 20%. The pellets can then be formed into "wet" flakes having a thickness of about 380 to 635 μm (0.015 to 0.025 inch), preferably while warm 76.6 to 87.8° C. (170 to 190° F.) to form desirably shaped and sized wet flakes.

In still another variation, the cooked cereal dough can be sheeted to form sheets of dough (e.g., 25 to 800 microns in thickness) and the individual pieces formed by cutting the sheet into individual pieces or by stamping out shaped pieces from the dough sheet.

In still another variation, the cooked cereal dough can be extruded through a die imparting a desired peripheral shape to form an extrudate cooked cereal dough rope. The dough rope can be cut to form individual shaped pieces.

For example, the dough having a moisture content of about 25% to 30% is first partially dried to a partially dried dough having a moisture content of about 12% to 20%. The partially dried dough can then be fed to piece forming apparatus that form the partially dried dough into individually shaped and sized pieces.

In still another variation, the cooked cereal dough can be fed to a biscuit forming device (see, for example, U.S. Pat. No. 5,342,188, entitled "Device For Crimping and Cutting Dough Ropes", issued Aug. 30, 1994 to C. E. Zimmermann, which is incorporated herein by reference) which forms the dough into minibiscuit shaped individual pieces.

In other variations, the cooked cereal dough is formed into individual "O" shaped pieces or rings, biscuits, minibiscuits (whether or not filled), shredded biscuits, shredded mini biscuits, rings, alphanumerics such as letters, figurines, spheres, shreds, figurines, spheres or other geometric shapes, nuggets, or even irregular shapes or mixtures thereof.

The present cereal compositions can be fabricated into any of a variety of common R-T-E cereal or snack forms including, shreds, biscuits, flakes, rings, or any common R-T-E cereal or cereal based snack product form, shape or size. The present cereal compositions can also be formulated and fabricated so as to provide puffed cereals of various shapes and sizes such as "biscuits". Especially desirable for use herein are biscuits, especially toasted biscuits. Especially for flakes, the forming step can first involve a substep of shaping the dough into pellets and then a finish substep of shaping the pellets into a final desired shape such as flakes.

For example, the cooked cereal dough can be fed to a pellet former to form pellets. In the preparation of R-T-E cereals in flake form, the pellets can be sized to have a pellet count of about 35 to 50 per 10 g and a moisture content of 16 to 20%. In the preparation of a flaked R-T-E cereal, the pellets can be partially dried to moisture contents of about 18 to 20%. The pellets can then be formed into "wet" flakes having a thickness of about 380 to 635 μm (0.015 to 0.025 inch), preferably while warm 76.6 to 87.8° C. (170 to 190° F.) to form desirably shaped and sized wet flakes.

Drying to Form Finished Pieces

The present methods further comprise the step of drying the shaped and sized individual pieces to form finished cereal products.

In still another highly preferred variation, the dough can be extruded under conditions of temperature and pressure so as to puff and expand (the "direct expansion" technique) and sectioned or cut into individual pieces to form individual expansions puffed R-T-E cereal or snack pieces. In this variation, the forming and drying steps are practiced simultaneously rather than sequentially.

In another variation, the drying step can involve heating the pieces under conditions that not only dry the piece but also cause the piece to expand to form dried and puffed or flaked finished pieces. For example, pellets can be gun puffed to form dried puffed R-T-E cereal products. Wet flakes can be toasted to dry, expand and tenderize to form finished R-T-E cereal flakes. In other variations, the finish drying can involve or hot air or microwave heating of the pellets.

The finished cereal pieces, however formed, can optionally be provided with a topical sugar coating and subsequently finish dried to remove the added moisture from the sugar coating solution to form presweetened R-T-E finished cereal pieces that include coffee flavoring. In other variations, an oil topical coating optionally with salt and/or flavors, is applied to form finished dried snack products. Both conventional sugar coatings and coatings employing high potency sweeteners, especially aspartame and potassium acesulfame, are known and can be used to provide presweetened cereals for use herein. The sugar coating is present in a weight ratio of sugar coating to cereal base of about 1:100 to about 50:100, preferably 10:100 to about 40:100. Typically, the sugar coating solution will have a blend of sugars and will comprise about 4 to 20% moisture. When higher amounts of the sugar coating solution, particularly for those solutions employing higher moisture levels, the slurry coated cereal pieces may be subjected to a final drying step to remove the added moisture from the sugar coating to provide finished dried products having a moisture content of about 1 to 5%.

In still another variation, the pieces or pellets can be deep fat fried to form dried puffed fried finished cereal products. Such dried puffed fried finished cereal pieces are especially desirable as coffee flavored snack products. Such products can absorb about 5 to 35% of frying fat during the drying and puffing step. An advantage of half products is that they can be produced in bulk in one location and thereafter fried in one or more finish operations to form the finished snack products. Not only are shipping costs reduced due to the reduced volume of the half products compared to the finished products but also breakage of the finished product is reduced. Also, the present invention can be used to provide coffee-flavored pretzel snack products.

In commercial practice, one or more of the present methods' steps can be combined and performed in or by a single piece of equipment. For example, a dry mix of cereal ingredients can be admixed with water and/or steam in a cooker extruder such as a single screw or twin screw. The cooker extruder heats, cooks and works the cereal ingredients to form a cooked cereal dough. In one variation, referred to in the art as direct expansion, the extruder conditions are such that upon extrusion, the cooked cereal dough expands and dries and is severed into small pieces to form R-T-E cereal pieces. The R-T-E cereal pieces can be in final form. In slight variations, the R-T-E cereal pieces can be further dried to final moisture contents, especially if a sugar and coffee flavor coating is applied.

The R-T-E cereal pieces so prepared can then be conventionally packaged for distribution and sale.

The R-T-E cereals of the present invention can be consumed in a conventional manner to obtain the nutritional and physiological benefits of a coffee flavored cereal food. The products are characterized by good flavor, good texture and other favorable organoleptic attributes. In one aspect, when the cereal is mixed with milk, within a short time, coffee flavored milk is generated.

The present invention is not to be limited in scope by the specific embodiments described herein. Indeed, various modifications of the invention in addition to those described herein will become apparent to those skilled in the art from the foregoing description and accompanying figures. The following examples are offered by way of illustration of the present invention, and not by way of limitation.

EXAMPLES

Example 1

Process of Preparing Coffee Flavored Cereal Products

Samples of coffee flavored cereal products were prepared using the following procedure. A base cereal product was prepared using a Wenger TX-52 twin-screw co-rotating extruder. A flavoring/coloring slurry was prepared by mixing coffee extract, barley malt extract, salt, sugar, water, and caramel color. This mixture was stirred for about 15 minutes until the sugar and salt were dissolved in the water and other liquid ingredients.

Example 2

Preparing Base Cereal Product

Rice flour was metered into the extruder inlet using a gravimetrically controlled feeder at a rate of about 70 kg/hr. The aforementioned flavoring/coloring slurry was added into the extruder at a rate of about 12 kg/hr using a positive displacement pump. Additional water was metered into the extruder as required. The co-rotating screws in the extruder were rotated at a speed between 300 and 400 revolutions per minute. The discharge end of the extruder was capped with an extrusion die with four slots which formed the product as it exited the extruder. In the extruder, the rice flour, slurry, and water were mixed and heated resulting in molten extrudate. As the mixture exited the extruder die and experienced a sudden pressure drop, a portion of the water in this heated mass instantaneously turned to steam, causing expansion and simultaneously cooling and setting of the product. At the same time, a rotating knife cut the expanded extrudate into pieces creating a product very similar in shape, structure, and texture to crisped rice. The bulk density of the product measured at this point was between 100 and 110 grams/liter. The resulting product was then pneumatically transferred to a Wenger 4800 dryer where it was deposited on the dryer belt and dried for 10 minutes at an air temperature of 120° C. After drying, the product was cooled by passing ambient air over the product for about 5 minutes.

The resulting base product has the following approximate composition per 100 grams.

Total Carbohydrates: 86.9 grams
Protein: 6.2 grams
Sugars: 7.3 grams
Caffeine: 75.7 mg Using the aforementioned dry base product, final ready-to-eat breakfast cereal samples were prepared using the following procedure.

Example 3

Preparing Coating Slurry

Coating slurries were prepared by mixing together ingredients such as sugar, brown sugar, dark corn syrup, coffee extract, spray dried coffee, freeze dried coffee, water, and caramel color. The recipes used for the coating are set forth in the Examples section. The mixture of coating slurry ingredients were heated until they just started to boil. The temperature of the slurry at this point depends on its composition and is generally about 105° C. to 115° C.

A specified quantity of coating slurry was applied to a specified quantity of base product. The percent of slurry as a percent of coating slurry plus base product ranged from 45% to 52%. A 300 gram total batch size was used for most tests. The heated coating slurries were applied by slowly pouring them over the base product while simultaneously stirring the base product. In doing so, the coating slurry was distributed and spread over the surface of the base product. The slurry was added over the course of about 1 minute.

The wet, coated cereal was then placed on a cookie sheet and placed in an oven set at 204° C. for 4 to 5 minutes to dry the coating on the surface of the coated cereal, reducing its overall moisture to about 3%. After removing the dried cereal from the oven, it was transferred to another cookie sheet and allowed to cool. After cooling, it was stirred to break apart most of the cereal pieces that stuck together during the coating/drying process and packaged into reclosable polyethylene bags.

The final cereal products have a range of final compositions depending on the coating slurry used for coating the products. A summary of the final sample compositions, per 100 grams of cereal, is shown in the Table 1; and a summary of the final sample compositions, per 30 gram serving of cereal, is shown in Table 2:

TABLE 1

| Sample ID | Total Carbohydrates (grams) | Protein (grams) | Sugars (grams) | Caffeine (milligrams) |
| --- | --- | --- | --- | --- |
| 1 | 89.4 | 5.02 | 36.9 | 324 |
| 2 | 89.5 | 5.00 | 37.4 | 328 |
| 3 | 89.3 | 5.11 | 36.6 | 343 |
| 4 | 89.5 | 5.01 | 37.7 | 337 |
| 5 | 88.5 | 5.84 | 32.1 | 346 |
| 6 | 89.2 | 5.13 | 35.5 | 333 |
| 7 | 89.0 | 5.25 | 33.9 | 339 |
| 8 | 88.9 | 5.13 | 35.0 | 335 |
| 9 | 89.0 | 5.18 | 35.2 | 335 |
| 10 | 89.0 | 5.15 | 35.2 | 335 |
| 11 | 89.1 | 5.22 | 35.2 | 340 |
| 12 | 89.2 | 5.15 | 18.2 | 340 |
| 13 | 88.7 | 5.44 | 15.5 | 349 |
| 14 | 89.4 | 4.97 | 38.1 | 333 |
| 15 | 90.0 | 4.26 | 35.2 | 340 |
| 16 | 90.0 | 4.26 | 35.2 | 340 |
| 17 | 89.5 | 4.97 | 37.8 | 328 |
| 18 | 89.6 | 4.85 | 37.3 | 330 |

TABLE 2

| Sample ID | Total Carbohydrates (grams) | Protein (grams) | Sugars (grams) | Caffeine (milligrams) |
| --- | --- | --- | --- | --- |
| 1 | 26.8 | 1.5 | 11.1 | 97.3 |
| 2 | 26.8 | 1.5 | 11.2 | 98.3 |
| 3 | 26.8 | 1.5 | 11.0 | 103.0 |
| 4 | 26.8 | 1.5 | 11.3 | 101.1 |
| 5 | 26.5 | 1.8 | 9.6 | 103.7 |
| 6 | 26.8 | 1.5 | 10.7 | 99.8 |
| 7 | 26.7 | 1.6 | 10.2 | 101.8 |
| 8 | 26.7 | 1.5 | 10.5 | 100.4 |
| 9 | 26.7 | 1.6 | 10.5 | 100.4 |
| 10 | 26.7 | 1.5 | 10.5 | 100.4 |
| 11 | 26.7 | 1.6 | 10.5 | 101.9 |
| 12 | 26.8 | 1.5 | 5.5 | 101.9 |
| 13 | 26.6 | 1.6 | 4.7 | 104.8 |
| 14 | 26.8 | 1.5 | 11.4 | 99.9 |
| 15 | 27.0 | 1.3 | 10.5 | 101.9 |
| 16 | 27.0 | 1.3 | 10.5 | 101.9 |
| 17 | 26.8 | 1.5 | 11.3 | 98.3 |
| 18 | 26.9 | 1.5 | 11.2 | 98.9 |

Example 4

| #1 Coating Recipe | |
|---|---|
| Ingredient | Percent |
| Sugars, granulated | 57.6% |
| Coffee Extract - Central American #275A | 37.6% |
| Caramel Color 050 DD Williamson | 4.9% |
| TOTAL | 100.0% |
| Coating Level | 45.0% |
| Base Level | 55.0% |

Example 5

| #2 Coating Recipe | |
|---|---|
| Ingredient | Percent |
| Sugars, granulated | 59.1% |
| Coffee Extract - Central American #275A | 38.4% |
| Caramel Color 050 DD Williamson | 2.4% |
| TOTAL | 100.0% |
| Coating Level | 45.0% |
| Base Level | 55.0% |

Example 6

| #3 Coating Recipe | |
|---|---|
| Ingredient | Percent |
| Sugars, granulated | 58.9% |
| Coffee Extract - Central American #275A | 37.6% |
| Caramel Color 050 DD Williamson | 3.6% |
| TOTAL | 100.0% |
| Coating Level | 45.0% |
| Base Level | 55.0% |

Example 7

| #4 Coating Recipe | |
|---|---|
| Ingredient | Percent |
| Sugars, granulated | 60.0% |
| Coffee Extract - Central American #275A | 40.0% |
| TOTAL | 100.0% |
| Coating Level | 45.0% |
| Base Level | 55.0% |

Example 8

| #5 Coating Recipe | |
|---|---|
| Ingredient | Percent |
| Sugars, granulated | 44.3% |
| Coffee Extract Cappuccino #878 | 55.7% |
| TOTAL | 100.0% |
| Coating Level | 45.4% |
| Base Level | 54.6% |

Example 9

| #6 Coating Recipe | |
|---|---|
| Ingredient | Percent |
| Sugars, granulated | 52.1% |
| Coffee Extract Espresso #142 | 30.8% |
| Water | 17.2% |
| TOTAL | 100.0% |
| Coating Level | 45.5% |
| Base Level | 54.5% |

Example 10

| #7 Coating Recipe | |
|---|---|
| Ingredient | Percent |
| Coffee Extract - Mexican #2200 | 49.9% |
| Caramel Color 050 DD Williamson | 50.1% |
| TOTAL | 100.0% |
| Coating Level | 98.4% |
| Base Level | 1.6% |

Example 11

| #8 Coating Recipe | |
|---|---|
| Ingredient | Percent |
| Sugars, brown | 52.2% |
| Coffee Extract Espresso #142 | 30.4% |
| Water | 17.4% |
| TOTAL | 100.0% |
| Coating Level | 46.0% |
| Base Level | 54.0% |

Example 12

| #9 Coating Recipe | |
|---|---|
| Ingredient | Percent |
| Syrups, corn, dark | 65.6% |
| Coffee Extract Espresso #142 | 30.7% |
| Water | 3.6% |
| TOTAL | 100.0% |
| Coating Level | 45.4% |
| Base Level | 54.6% |

Example 13

| #10 Coating Recipe | |
|---|---|
| Ingredient | Percent |
| Sugars, brown | 26.2% |
| Syrups, corn, dark | 32.7% |
| Coffee Extract Espresso #142 | 30.5% |
| Water | 10.6% |
| TOTAL | 100.0% |
| Coating Level | 45.8% |
| Base Level | 54.2% |

Example 14

| #11 Coating Recipe | |
|---|---|
| Ingredient | Percent |
| Sugars, granulated | 50.7% |
| Coffee Extract Espresso #142 | 19.5% |
| Coffee Extract - Central American #275A | 10.9% |
| Coffee Extract Cappuccino #878 | 4.4% |
| Caramel Color 050 DD Williamson | 4.4% |
| Water | 10.2% |
| TOTAL | 100.0% |
| Coating Level | 45.8% |
| Base Level | 54.2% |

Example 15

| #12 Coating Recipe | |
|---|---|
| Ingredient | Percent |
| Sugars, granulated | 19.7% |
| Maltodextrin (5 DE), GPC, Maltrin ® M040 | 32.7% |
| Coffee Extract Espresso #142 | 19.5% |
| Coffee Extract - Central American #275A | 10.9% |
| Coffee Extract Cappuccino #878 | 4.4% |
| Caramel Color 050 DD Williamson | 4.4% |
| Water | 8.5% |
| TOTAL | 100.0% |
| Coating Level | 45.9% |
| Base Level | 54.1% |

Example 16

| #13 Coating Recipe | |
|---|---|
| Ingredient | Percent |
| Sugars, granulated | 11.7% |
| Maltodextrin (15 DE), GPC, Maltrin ® M150 | 31.5% |
| Coffee Extract Espresso #142 | 17.8% |
| Coffee Extract - Central American #275A | 10.6% |
| Coffee Extract Cappuccino #878 | 4.3% |
| Caramel Color 050 DD Williamson | 4.3% |
| Water | 19.9% |
| TOTAL | 100.0% |
| Coating Level | 47.0% |
| Base Level | 53.0% |

Example 17

| #14 Coating Recipe | |
|---|---|
| Ingredient | Percent |
| Sugars, granulated | 23.1% |
| Syrups, corn, dark | 29.9% |
| Coffee Extract - Central American #275A | 30.0% |
| Caramel Color 050 DD Williamson | 3.1% |
| Water | 13.9% |
| TOTAL | 100.0% |
| Coating Level | 52.0% |
| Base Level | 48.0% |

Example 18

| #15 Coating Recipe | |
|---|---|
| Ingredient | Percent |
| Sugars, granulated | 57.6% |
| Spray Dried Coffee - Espresso - Autocrat | 20.7% |
| Caramel Color 050 DD Williamson | 3.7% |
| Water | 18.0% |
| TOTAL | 100.0% |
| Coating Level | 43.2% |
| Base Level | 56.8% |

Example 19

| #16 Coating Recipe | |
|---|---|
| Ingredient | Percent |
| Sugars, granulated | 57.6% |
| Instant - Espresso - Medaglia Doro | 20.7% |
| Caramel Color 050 DD Williamson | 3.7% |
| Water | 18.0% |
| TOTAL | 100.0% |
| Coating Level | 43.2% |
| Base Level | 56.8% |

Example 20

| #17 Coating Recipe | |
|---|---|
| Ingredient | Percent |
| Sugars, granulated | 49.4% |
| Coffee Extract - Central American #275A | 31.7% |
| Caramel Color 050 DD Williamson | 3.2% |
| Water | 15.6% |
| TOTAL | 100.0% |
| Coating Level | 50.0% |
| Base Level | 50.0% |

Example 21

| #18 Coating Recipe | |
|---|---|
| Ingredient | Percent |
| Sugars, granulated | 53.0% |
| Coffee Extract - Mexican #2200 | 37.2% |
| Caramel Color 050 DD Williamson | 3.4% |
| Water | 6.5% |
| TOTAL | 100.0% |
| Coating Level | 48.4% |
| Base Level | 51.6% |

Those skilled in the art will recognize, or be able to ascertain using no more than routine experimentation, many equivalents to the specific embodiments of the invention specifically described herein.

What is claimed is:

1. A ready-to-eat cereal composition comprising:
a puffed starchy body formed of a cereal dough composition comprising flour, coffee powder, and water;
a slurry coating disposed about the puffed starchy body that forms about 35 to 60% by weight of the ready-to-eat cereal composition prior to drying, the slurry coating comprising greater than 40% and up to 60% by weight of a coffee extract;
about 250 mg to about 400 mg caffeine per 100 g of ready-to-eat cereal, and wherein from about 21 to 24% by weight of the caffeine is contained in the starchy body; and
wherein the ready-to-eat cereal has an overall moisture content of about 1 to 5%.

2. The cereal according to claim 1, wherein the coffee extract or coffee powder has a flavor chosen from the group consisting of latte, cappuccino, espresso, hazelnut, mocha, amaretto, chocolate, chocolate raspberry, irish cream, vanilla, almond, butterscotch, caramel, cinnamon, creme de menthe, and kahlua.

3. The cereal according to claim 1, wherein the caffeine is present from about 300 mg to about 375 mg per 100 g of the cereal.

4. The cereal according to claim 1, wherein the caffeine is present from about 315 mg to about 350 mg per 100 g of the cereal.

5. The cereal according to claim 1, comprising sugar.

6. The cereal according to claim 5, wherein the sugar is present from about 5 to about 50 grams per 100 g of the cereal.

7. The cereal according to claim 6, wherein the sugar is present from about 10 to about 45 grams per 100 g of the cereal.

8. The cereal according to claim 6, wherein the flavor powder is attained from one of coffee bean, spray dried coffee, and freeze dried coffee.

9. The cereal according to claim 1, having a shiny surface.

10. The cereal according to claim 1, having a floury surface.

11. The cereal according to claim 1, wherein the ready-to-eat cereal is produced by applying the slurry to the puffed starchy body to produce a wet cereal, the slurry further comprising water and sweetener, the wet cereal being dried to form the ready-to-eat cereal.

12. The cereal according to claim 11, wherein the ready-to-eat cereal is produced by drying the wet cereal to have an overall moisture of about 1 to 5%.

13. The cereal according to claim 11, wherein the wet cereal comprises about 40% to about 55% by weight of the slurry.

14. The cereal according to claim 11, wherein the slurry comprises greater than 40% and up to about 50% by weight coffee extract.

15. The cereal according to claim 11, wherein the slurry is produced by boiling a mixture comprising:
water;
coffee extract; optionally spray dried coffee, freeze dried coffee, artificial coffee flavoring or a combination thereof; and
sweetener.

16. The cereal according to claim 11, wherein the slurry consists of water, coffee extract, sweetener, and optionally colorants; and
wherein the coffee extract is produced from the group consisting of spray dried coffee, freeze dried coffee, coffee bean and combinations thereof.

17. The cereal according to claim 16, wherein the sweetener is selected from the group consisting of fructose, maltose, dextrose, honey, fruit juice solids, and brown sugar.

18. The cereal according to claim 1, wherein the ready-to-eat cereal is substantially free of milk or milk solids.

19. The cereal according to claim 1, wherein the ready-to-eat cereal comprises 1 to 8% malt syrup.

20. The cereal according to claim 1, wherein the ready-to-eat cereal comprises 1 to 40% of a soy ingredient.

21. The cereal according to claim 1, wherein the ready-to-eat cereal comprises less than 3% fat.

22. A ready-to-eat cereal product comprising:
a plurality of ready-to-eat rice cereal flakes formed of a rice dough composition comprising coffee powder;
a slurry coating disposed about the cereal flakes that forms about 35 to 60% by weight of the ready-to-eat cereal product prior to drying, the slurry coating comprising great than 40% and up to 60% by weight of a coffee extract;
about 250 mg to 400 mg caffeine per 100 g serving of the ready-to-eat cereal, and wherein from about 21 to 24% by weight of the caffeine is contained in the cereal flakes; and
wherein the ready-to-eat cereal product has an overall sugar content of from 15% to 40% by weight.

23. A ready-to-eat cereal comprising:
a cereal base formed of a composition comprising a coffee powder, and a grain selected from the group of wheat, rice, corn, oats, barley, rye, triticale, and combinations thereof;

a coating disposed about the cereal base and comprising a slurry of at least water, greater than 40% and up to 60% by weight of a coffee extract, and a sweetener, the coating being produced by applying the slurry to the cereal base to produce a wet cereal wherein the slurry coating forms 35 to 60% by weight of the wet cereal; and drying the wet cereal to produce a ready-to-eat cereal having a moisture content of about 1 to 5%;

about 250 mg to about 400 mg caffeine per 100 g of the ready-to-eat cereal, and wherein from about 21 to 24% by weight of the caffeine is contained in the cereal base; and the ready-to-eat cereal being substantially free of milk or milk solids.

24. The cereal according to claim 23, wherein the ready-to-eat cereal is shaped substantially in the form of coffee bean.

25. The cereal according to claim 23, wherein the wet cereal comprises about 40% to about 55% by weight slurry, wherein the slurry comprises greater than 40% and up to about 50% by weight coffee extract.

26. The cereal according to claim 23, wherein the slurry consists of water; coffee extract, sweetener, optionally colorants; and wherein the coffee extract is formed from a material selected from the group consisting of spray dried coffee, freeze dried coffee, and combinations thereof.

27. The cereal according to claim 26, wherein the sweetener is selected from the group consisting of fructose, maltose, dextrose, honey, fruit juice solids, and brown sugar.

28. The cereal according to claim 23, wherein the ready-to-eat cereal comprises less than 3% fat, 1 to 8% malt syrup, and 1 to 40% of a soy ingredient.

* * * * *